Jan. 14, 1958   H. MOORE   2,819,625
SCREW FOR TUNING SLUG
Filed July 24, 1956

*INVENTOR*
*Harrington Moore*
by Wright, Brown, Quimby & May
*ATTYS*

United States Patent Office 2,819,625
Patented Jan. 14, 1958

2,819,625

SCREW FOR TUNING SLUG

Harrington Moore, East Acton, Mass.

Application July 24, 1956, Serial No. 599,852

4 Claims. (Cl. 74—424.8)

This invention relates to a screw specially designed for use in a tuning slug of the kind used in television apparatus. Tuning slugs as now made are small fiber tubes surrounded by a number of wire coils. A screw is inserted in one end and is axially adjustable therein. To hold the screw in its position of axial adjustment, a transverse slot is cut in the wall of the tube and a spring wire is mounted to ride in the slot so that a portion of the wire forms a chord in the bore of the tube and engages in the thread groove of a screw within the tube. When the screw is rotated, its engagement with the spring wire causes it to advance in one direction or the other according to the direction of its rotations. In practice it sometimes happens that the screw is moved forward in the tube until it is beyond the wire. When this happens, the apparatus of which the tuning slug is a part must be disassembled sufficiently to permit the removal of the tuning slug which is necessary for the recovery of the screw therein.

According to the present invention, a specially formed screw is provided which cannot advance beyond the spring wire and which is always ready to be backed out of the tube when reversely rotated.

For a more complete understanding of the invention reference may be had to the following description thereof and to the drawing of which—

Figure 1:
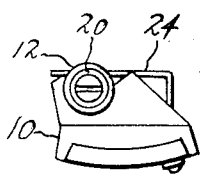
Figure 1 is an end elevation of a tuning slug.
Figure 2:
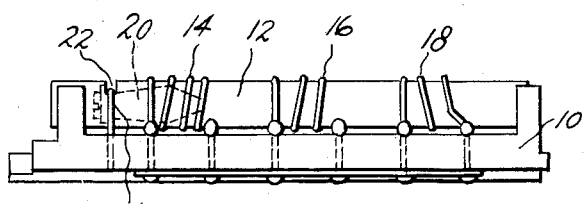
Figure 2 is a side elevation of the same.

A typical tuning slug for television apparatus is shown in Figures 1 and 2. This comprises a convenient base 10 on which is mounted a fiber tube 12. A number of wire coils 14, 16 and 18 are mounted on the base 10 and encircle the tube at intervals. Within the tube is a tuning screw 20 which is adapted to be adjusted inward or outward to tune the apparatus of which the slug is a part. To facilitate the axial adjustment of the screw 20 and to hold it in adjusted position, a transverse slot 22 is cut in the tube wall near an end thereof to receive a portion of a spring wire 24 which may be mounted on the base 10. The portion of the wire 24 which enters the slot 22 extends into the bore of the tube 12 and forms a chord therein. The purpose of the portion of the spring wire within the tube is to engage in the thread valley of the tuning screw 20 so as to act as an interior thread for the tube whereby the screw can be advanced axially in either direction by rotation and can be held in adjusted position in the tube, except that if the thread on the screw is of the usual V type, an axial push on the screw may cam the spring wire out of the convolution of the thread valley in which it is engaged. If the tuning screw is of the ordinary headless kind and is advanced inward beyond the spring wire, it is practically impossible to get the spring wire into the thread groove again without removing the slug from its position in the television apparatus for access to the spring wire. According to the present invention a screw is provided which cannot be advanced entirely beyond the spring wire and can always be backed out by turning in the reverse direction. For this purpose the threaded portion of the screw is tapered toward the head or driving end, and the head 30, or at least a portion thereof, is made with the maximum diameter, that is, with a diameter slightly less than the interior diameter of the tube 12. This provides a forward-facing shoulder 32 in a plane perpendicular to the axis of the screw. The convolution of the thread next to the head 30 preferably has a crest diameter less than the difference between the diameters of the head and the wire 24 so that the shoulder 32 acts as a positive stop to prevent the head of the screw from passing beyond the spring wire 24, even when the spring rides over the crest of the thread as the screw is being turned. To keep the screw centered in the bore of the tube, a convolution of the thread, spaced from the head 30, is given a crest diameter equal to that of the head 30. As shown, this convolution 34 may be at the forward end of the threaded portion of the screw. Beyond the threaded portion may be a tapered end portion 36 to facilitate the initial introduction of the screw into the tube 12.

Figure 3:
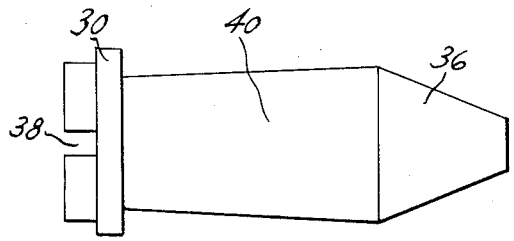
Figure 3 is a side elevation, on an enlarged scale, of a blank for a screw embodying the invention.
Figure 4:
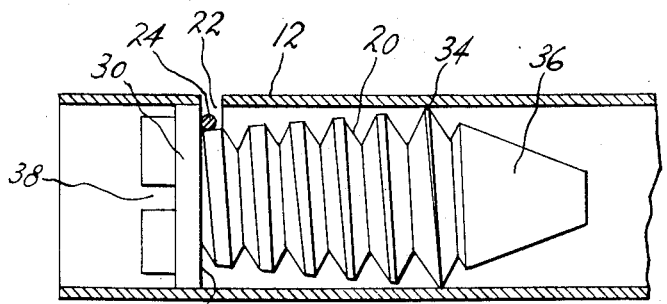
Figure 4 is an enlarged sectional view of a portion of the tuning slug, showing the novel screw therein.

A preferred method of making a screw as described is to make a blank (Figure 3) with a head 30 having a transverse slot 38 therein, an intermediate portion 40 which tapers toward the head 30, and a forward end portion 36 which tapers towards its extremity. A screw thread is rolled into the mid portion 40, the result being as illustrated in Figure 4. As shown, the outside or crest diameter of the thread decreases from the maximum convolution 34 to the head 30, and the thread also decreases in depth as it approaches the head 30. When the screw is turned to advance it in the tube 12, it advances until the wire 24 is engaged by the shoulder 32 which stops further axial progress inward.

If the turning of the screw continues, the wire 24 rides over the reduced crest of the thread near the shoulder 32. If the screw is turned in the reverse direction, the wire 24 rides in the groove of the thread and cams the screw outward.

I claim:

1. In a tuning slug comprising a fiber tube having a transverse slot in the side thereof and a spring wire yieldingly supported with a portion in said slot extending into the bore of the tube; a screw having a head and a threaded shank, said head and a convolution of the thread spaced from the head having an outside diameter approximately equal to the interior diameter of said tube, said thread having a convolution adjacent to said head with a crest diameter less than the difference between the diameters of said head and of said spring wire.

2. In a tuning slug comprising a fiber tube having a transverse slot in the side thereof and a spring wire yieldingly supported with a portion in said slot extending into the bore of the tube; a screw comprising a head and a threaded shank, said head having a diameter substantially equal to the interior diameter of said tube, said shank having a convolution of its thread adjacent to said head with a crest diameter less than the diameter of the head, and a convolution of said thread axially spaced from said head with a crest diameter substantially equal to that of the head.

3. In a tuning slug as described in claim 2, said screw having a series of convolutions successively increasing in crest diameter from the convolution adjacent to the head to said convolution spaced therefrom.

4. In a tuning slug as described in claim 2, said screw having a circular groove into which the valley of said thread merges near the end of the screw remote from the head thereof.

References Cited in the file of this patent

UNITED STATES PATENTS 192,636    Collins et al. _____ July 3, 1877